United States Patent [19]

Immel

[11] 4,289,212
[45] Sep. 15, 1981

[54] SELF-PROPELLED BATTERY POWERED CART FOR PUSHING DISABLED VEHICLES

[76] Inventor: Erich A. Immel, 6525 Fairmount Ave., El Cerrito, Calif. 94530

[21] Appl. No.: 42,990

[22] Filed: May 29, 1979

[51] Int. Cl.³ .............................................. B62D 51/04
[52] U.S. Cl. ................. 180/19 R; 254/8 R; 254/133 R
[58] Field of Search ............... 180/19 R, 19 S, 19 H, 180/11, 14 A, 14 C, 14 E, 14 R, 15, 68.5; 280/400; 254/8 RX, 133 RX

[56] References Cited

U.S. PATENT DOCUMENTS

| | | | |
|---|---|---|---|
| 2,626,671 | 1/1953 | Hardy et al. | 180/19 R |
| 2,754,602 | 7/1956 | Gans | 180/19 R |
| 3,035,847 | 5/1962 | Born | 280/47.24 |
| 3,166,141 | 1/1965 | Shields et al. | 180/19 R |
| 3,199,621 | 8/1965 | Seaman | 180/19 R |
| 3,312,299 | 4/1967 | Kuecker | 180/11 |
| 3,417,833 | 12/1968 | McRae | 180/19 R |
| 3,831,694 | 8/1974 | MacKew | 180/19 R |
| 3,866,701 | 2/1975 | Bekker | 180/14 C |

Primary Examiner—Joseph F. Peters, Jr.
Assistant Examiner—Donn McGiehan
Attorney, Agent, or Firm—Bruce & McCoy

[57] ABSTRACT

A battery-powered electric motor driven cart for pushing disabled vehicles and having a frame designed to support a portion of the vehicle's weight for enhancing the traction of the cart's drive wheels with the ground. The cart can be operated remotely to permit steered movement of the vehicle by a single person.

2 Claims, 6 Drawing Figures

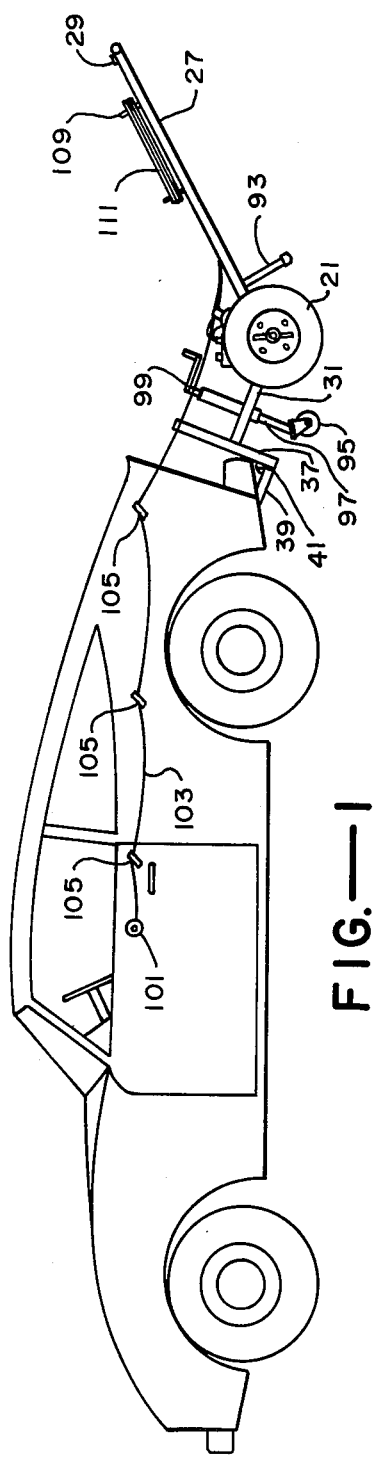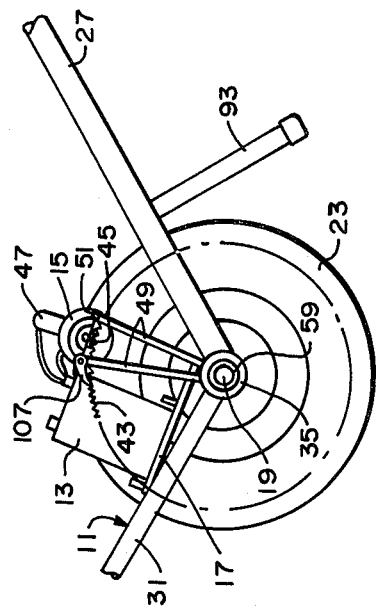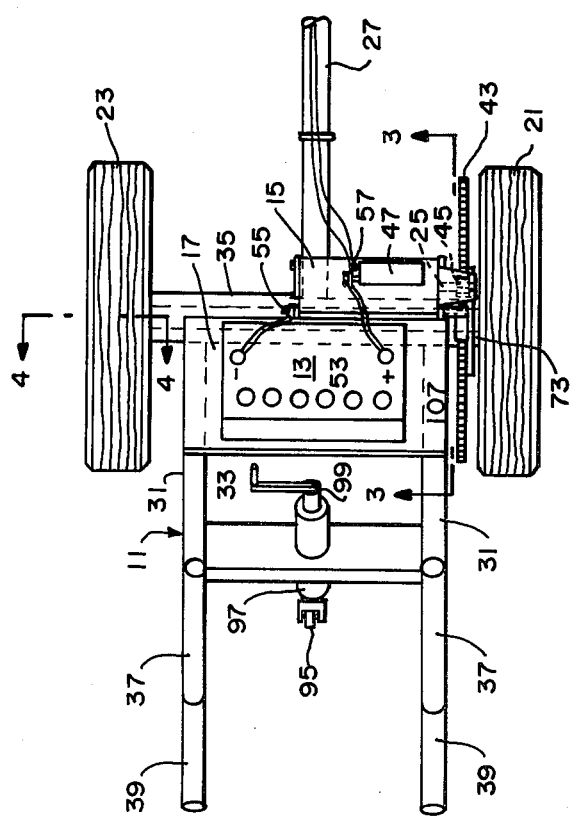

U.S. Patent  Sep. 15, 1981  Sheet 2 of 2  4,289,212
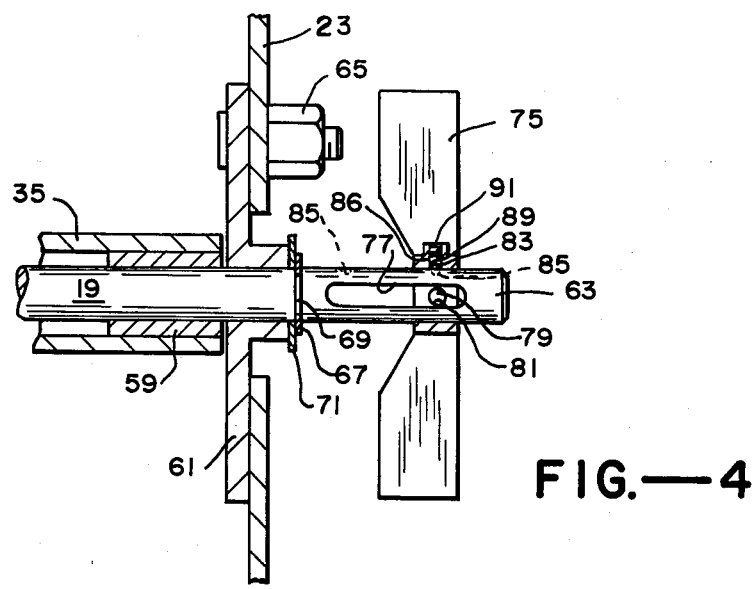
FIG.—4
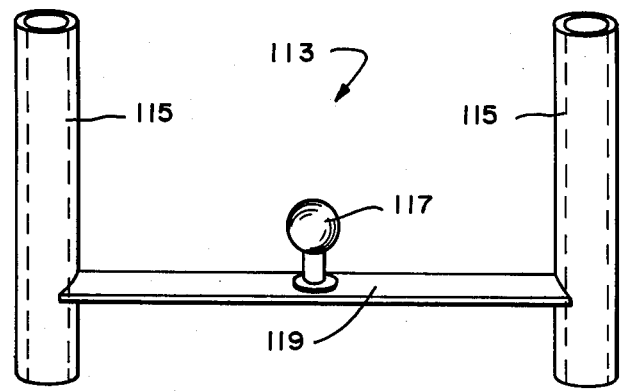
FIG.—5
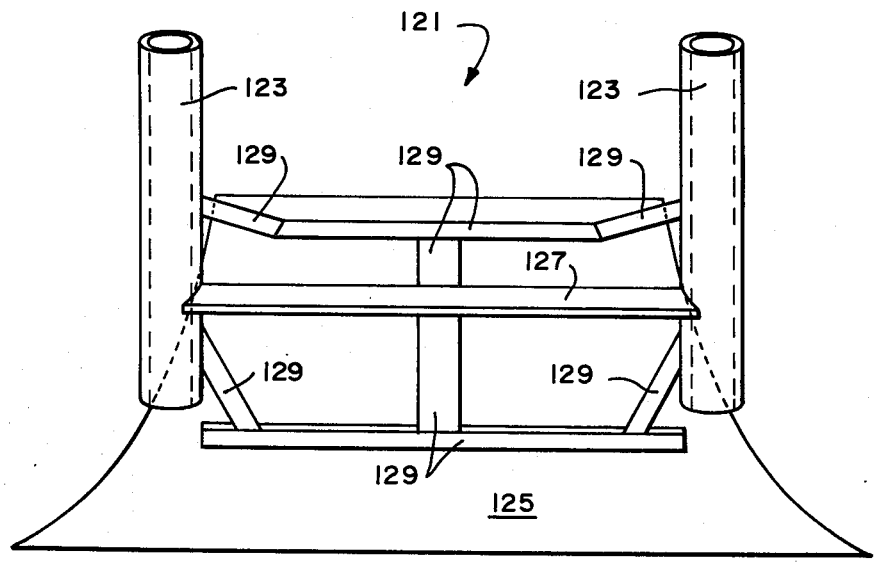
FIG.—6

SELF-PROPELLED BATTERY POWERED CART FOR PUSHING DISABLED VEHICLES

BACKGROUND OF THE INVENTION

1. Field of the Invention

The present invention relates to self-propelled carts and more particularly to a device for pushing a disabled automobile or other large unpowered vehicle. Operators of gas stations and other automobile repair shops have always found it difficult to move disabled vehicles about their premises. A large disabled vehicle typically requires the time and efforts of three or more men to push it to a maintenance area for repair. Thus, particularly in smaller vehicle repair shops employing only one or two men, it is extremely difficult to move heavy disabled vehicles, and many injuries have resulted from attempts to do so. The present invention can push the heaviest of automobiles and, as it is operable by remote control, may be utilized by a single man who can seat himself within the disabled vehicle to steer it while it is being pushed by the device.

2. Description of the Prior Art

Prior art pertinent to the present invention involves golf carts and similar self-propelled vehicles. Such carts, typified by U.S. Pat. No. 3,199,621 issued on Oct. 10, 1965 to J. W. Seaman, for Self-Propelling Power Unit For Golf Bag Cart, are designed to travel long distances with low power output for use on golf courses. Additionally, the weight that is utilized to provide traction for the wheels of the device is primarily supplied by the weight of the device itself. Such carts are unsuited for pushing a heavy vehicle due to their low power output and their lack of sufficient weight for providing traction when pushing.

The instant invention in distinction to the golf carts typified by Seaman is designed for traveling short distances with a high-power output. It is best suited for use around a gas station or other vehicle repair shop where short distance pushing of heavy vehicles is required. The frame of the device is designed such that the weight of the pushed vehicle, in addition to the device's own weight, generates a significant portion of the tractive force necessary for its operation.

McRae, U.S. Pat. No. 3,417,833, issued Dec. 24, 1968, discloses a two-wheeled carriage, driven by an electrical motor, for pushing vehicles. It is constructed such that successively greater weight is transferred from the pushed vehicle onto the driving wheels of the carriage to increase traction for pushing the vehicle. In McRae, the weight transfer is accomplished by rotation of the carriage about the drive wheels. The weight of the vehicle is transferred in part to the carriage through a lifting arm positioned at a specified angle ahead of the pivoting point of the drive wheels. Although the McRae reference is directed to solving the problem where four to five persons are required to push a disabled vehicle, McRae is only a partial solution to the problem in that the number of persons required is merely reduced to two: one to manipulate the device and the second to steer the pushed vehicle. Further, the structure taught by McRae is expensive, heavy, and cumbersome, making it unsuitable for many markets and applications.

These problems of the McRae device are solved by the present invention which, in comparison with McRae, is operable by a single person and utilizes an inexpensive, lightweight, compact, and versatile construction. By the use of stabilizing means and relocation of electrical controls, the present invention permits a single person to operate the device while simultaneously operating the steering wheel of the pushed vehicle to effect steered movement of the vehicle.

SUMMARY OF THE INVENTION

The present invention is a battery powered cart for pushing a disabled automobile or other large unpowered vehicle. It comprises a frame having a battery and electric drive motor mounted thereon, with an electrical switch means for activating the electric drive motor by utilization of current from the battery. A transversely disposed axle is secured to the frame, and a drive wheel is mounted on each of the outer ends of the axle with each drive wheel having a means for engaging it with the axle. A means is provided for engaging the drive shaft of the electric drive motor to the axle whereby rotation of the drive shaft will cause the axle to rotate. A portion of the frame projects forward of the axle and is formed for contacting and pushing a vehicle with the length of this portion of the frame from the wheel axis to the vehicle contact point being sufficient to place the contact point relatively close in height to the height of the axle so as to prevent the cart from rotating over backwards about the axle when pushing a vehicle. The frame and axle are arranged such that upon operation of the device, the portion of the frame contacting the vehicle will make contact at a point that is higher off the ground than the axis of the axle whereby pushing the vehicle will cause the frame to rotate backwards about the axle whereby a portion of the weight of the vehicle will be imposed on the device to enhance the frictional contact of the drive wheels with the ground to provide greater traction for pushing the vehicle. To stabilize the rotation of the frame about the axle, a third wheel is rotatably fixed to the frame at a point forward of the drive wheels. One aspect of the invention provides for at least two tubular shaped upwardly projecting vehicle push bars forming part of the contact yoke for pushing the vehicle. The push bars are adapted to slidably receive mating tubular member of an accessory attachment whereby the accessory attachment can be attached to the cart by simply inserting it over the tubular supports of the yoke. Further aspects of the invention include a skid bar attached to the cart frame and a rack formed on the handle bar of the cart frame for conveniently carrying battery jumper cables.

OBJECTS OF THE INVENTION

It is therefore an important object of the present invention to provide a self-propelled battery operated device to push disabled vehicles.

It is another object of the present invention to provide a device to push disabled vehicles that is operable by a single person.

It is a further object of the present invention to provide a device that can push disabled vehicles by remote control.

It is yet another object of the present invention to provide a lightweight device which utilizes a portion of the weight of the vehicle being pushed to increase the tractive power of the device.

It is yet a further object of the present invention to provide a device which is economical to manufacture and yet durable and easy to use.

It is still another object of the present invention to provide a device that is adaptable for pushing trailers and other ball connected vehicles.

It is still a further object of the present invention to provide a device that is adaptable for use as a snow plow.

Further objects of the present invention will become apparent from the description of the preferred embodiment of the invention when it is considered in conjunction with the accompanying drawings.

DESCRIPTION OF THE DRAWINGS

FIG. 1 is a side elevational view of the self propelled battery powered cart of the present invention;

FIG. 2 is a top plan view thereof;

FIG. 3 is a sectional view taken along Lines 3—3 of FIG. 2;

FIG. 4 is a sectional view taken along Lines 4—4 of FIG. 2;

FIG. 5 is a front elevational view of the trailer ball attachment for the present invention;

FIG. 6 is a front elevational view of the snow shovel attachment for the present invention.

DESCRIPTION OF THE PREFERRED EMBODIMENT

The present invention is a self-propelled battery powered cart for pushing a disabled automobile or other large unpowered vehicle such as a house trailer or boat trailer. The invention, as depicted in FIG. 2, consists of a frame 11 upon which is mounted a battery 13 and an electric motor 15. A plate 17 is mounted on the frame 11 to serve as a platform for the battery 13. An axle 19 is secured in a transverse orientation to the frame 11, and drive wheels 21 and 23 are mounted on each of the outer ends of the axle 19 with a means for securing them thereto. The drive shaft 25 of the electric motor 15 is engagable with the axle 19 such that rotation of the drive shaft 25 will cause the axle 19 to rotate. A handlebar 27 is secured to the frame 11 approximately midway between the drive wheels 21 and 23 and formed to project upwardly and rearwardly to a height suitable for use by a standing operator in manipulating the device into a proper contact position for pushing a disabled vehicle. An electrical starter switch 29 to activate the electric motor 15 by utilizing current from the battery 13 is located on the handlebar 27 for ease of operation. A forward projecting portion of the frame 11 is designed to make contact with the disabled vehicle for pushing it.

In the preferred embodiment the frame 11 is made out of tubular steel or other material which is of sufficient strength to withstand the expected load conditions and which is sufficiently inexpensive to allow for low cost construction of the device. The frame 11 essentially comprises two forwardly projecting members 31 which are braced 33 together towards their forward ends and engaged by welding or other suitable means to a tubular axle housing 35 at their rearward ends. A vehicle push bar 37 is formed to project upwardly from the forward end of each forwardly projecting frame member 31, and a forwardly projecting vehicle push bar 39 is attached to the lower end of each upwardly projecting vehicle push bar 37. The combination of the upward and forward projecting vehicle push bars provides a vehicle contact point in the form of an "L" shaped push frame yoke 41 wherein the bumper of the automobile will reside during pushing.

The electric motor 15 that is utilized to power the device may be a standard automobile electrical starter motor; but any other suitable electric motor could be substituted therefore. To provide for the transmission of power from the electric motor 15 to the axle 19, a large gear 43 is directly attached to the axle; this gear may be a typical ring gear from an automobile automatic transmission. Engagement of the electric motor 15 to the ring gear 43 can be accomplished in the same manner as it would be in an automobile; that is, through the use of a pinion gear 45 mounted on the drive shaft 25 of the electric motor 15 with an actuating means for propelling the pinion gear 45 into engagement with the ring gear 43 when the electric motor 15 is activated by the operator. It is understood that many types of well known actuating means, such as the commercially termed BENDIX gear or a common solonoid 47 actuated lever can be used to move the pinion gear 45. The electric motor 15 could also be directly engaged to the ring gear with no actuating means required. As is best depicted in FIG. 3, a configuration wherein the pinion gear makes direct contact with the ring gear 43 requires that the electric motor 15 be placed at an elevated position relative to the axle housing 35. This is accomplished by the utilization of a brace structure wherein metal braces 49 are affixed at their lower end to the axle housing 35 and at their upper ends to the electric motor attachment bolts 51. Other types of electric motors may necessitate utilization of other types of brace structures.

The electrical circuitry for the operation of the preferred embodiment of the device is similar to the basic automobile starter circuitry. The positive terminal of the battery 13 is connected to a solenoid main starter switch terminal 53 and the negative terminal of the battery 13 is connected to the grounded terminal of the starter motor 55; the electrical starter switch 29 for the device is connected to the field terminals 57 of the solenoid 47. Upon operation of the starter switch 29, the field of the solenoid is activated causing the plunger of the solenoid to move and close the main starting switch located therein. The starter motor 15 is thereby activated and its drive shaft 25 commences to turn. The actuating means then propels the pinion gear 45 into engagement with the ring gear 43, and continued rotation of the drive shaft 25 causes the rotating pinion gear 45 to rotate the ring gear 43 whereby the axle 19 engaged to the ring gear rotates.

The axle assembly consists of a tubular axle housing 35 which is disposed transversely to the two forwardly projecting frame members 31. The wheel axle 19 resides in and projects through the axle housing 35 with sufficient outward projection on each end to allow for the attachment of the drive wheels 21 and 23 and associated drive wheel engagement members as hereinafter described. For simplicity and economy of construction, the axle 19 is retained at each end of the axle housing 35 by a simple grease lubricated journal bearing 59; it being understood that many other types of bearings could be used in this instance.

In the preferred embodiment, as depicted in FIG. 4, each of the drive wheels of the device is formed to be selectively engagable with the axle 19 such that each wheel may be independently engaged or disengaged from the axle. The wheel engagement members consist of a free wheeling hub 61 mounted on the axle 19 to which the wheel 21 or 23 is attached by lug nuts 65 or other suitable means. The wheel hubs 61 are held onto the axle 19 by use of a horse shoe shaped external snap ring 67 which fits into a groove 69 that is cut into the axle 19 at an appropriate outer point for restraining the wheel. A washer 71 may be placed between the snap ring 67 and the hub 61 to reduce frictional wear on the snap ring 67. The inner spacing of drive wheel 23 is controlled by the axle housing's 35 contact with the hub 61. The inner spacing of drive wheel 21 requires a tubular spacer 73 positioned on the axle between the ring gear 43 and the wheel hub 61. The spacer 73 acts to prevent drive wheel 21 from contacting the ring gear 43. It is obvious that other means of wheel attachment can be employed.

Selective engagement of each drive wheel to the axle is achieved through use of a driving dog 75 which is slidably engaged with the outward extension of the axle 63. An axial slot 77 is formed to project through the outward extension of the axle 63 and a dog pin 79 engaged to the driving dog 75 extends through the slot 77 to rotationally secure the driving dog 75 to the axle 63 and yet allow lateral movement thereof. The driving dog 75 is formed with a dog pin hole 81 passing through the central portion 87 thereof for engagement of the dog pin 79 thereto. A protuberance is formed on the wheel hub to contact the driving dog; the protruding lug nuts 65 may be utilized for this purpose. When the driving dog 75 is moved towards the wheel hub 61 it will make contact with the protuberance 65 and drive the wheel 21 or 23 when the axle 19 rotates. When the driving dog 75 is moved away from the wheel it will no longer contact the protuberance 65 and the wheel 21 or 23 will become free wheeling on the axle 19. To hold the driving dog 75 in engaged or disengaged positions on the axle 63 a spring loaded ball 83 may be utilized, with associated half-round holes 85 being formed in the axle 63 to receive the ball 83. A hole 86 must be formed through the central body 87 of the driving dog 75 to insert the ball 83, the spring 89 and permit a cap 91 to be secured thereupon. Use of the driving dogs thus allows the operator to select between a free wheeling configuration for ease of maneuvering, a single wheel drive configuration and a double wheel drive configuration. In practice it has been found that a single wheel drive configuration is sufficient to push most vehicles and has a greater ease of turning than a double wheel drive configuration, however, the latter has more power for pushing heavier vehicles and is utilized when pushing a vehicle up a hill.

To utilize the invention it is necessary to maneuver it to the point from which the vehicle is to be pushed. For an automobile, this point would generally be at the midpoint of the bumper of the automobile. After having maneuvered the device to the bumper of the automobile, the operator presses downward upon the handlebar 27; the device thereupon pivots about the axis of the axle 19, and the forward projecting vehicle push bars 39 rise upwardly to contact the vehicle bumper in the "L" shaped push frame yoke 41 provided therefor. The device is designed such that the contact point of the device with the bumper will be higher off the ground than the axis of the axle. Upon depressing the starter switch 29 the device moves forward to push the vehicle. Because the vehicle contact point is higher off the ground than the axis of the axle, the frame 11 will rotate backwards about the axle 19 upon first contact with the bumper. The backward rotation causes the push frame members 37 and 39 to lift against the bumper and lift a portion of the vehicle's weight. This weight becomes imposed on the device and aids the tractive power of the device by increasing the frictional contact of the drive wheels 21 and 23 with the ground. As the frame is designed to rotate backwards, it is important that the length of the frame, from the axis of the axle 19 to the apex of the "L" shaped push frame yoke 41, be long enough to prevent the device from tipping over backwards when pushing a vehicle. As clearly illustrated by the drawings, the length of the frame forward of the axle 19 provides a point of contact between the vehicle and push frame members 37, 39 which will be relatively close in height to the height of the axle 19. The height of the vehicle/frame contact point should only be sufficiently above the axle height to provide the necessary torque to aid in tractive power and lifting as above described. After the vehicle is moving forward with sufficient speed the lift effect will cease, but it will recommence whenever the vehicle slows down. This lift effect is especially important in pushing a vehicle up a hill as greater traction is then required of the device to push the vehicle.

A skid bar 93 is attached to the frame 11 and projects rearwardly and downwardly from a point proximate the lower end of the handlebar 27 to prevent the device from tipping over backwards. The skid bar 93 must be sufficiently short to allow the handlebar to be depressed downwards when engaging a vehicle and yet be long enough to provide a meaningful leg when the device is tipped over backwards. Its length is dependent on several factors such as the radius of the wheels 21 and 23 that are utilized, the length of the forward projection of the frame of the device, the angle between the forward projection of the frame 11 of the device and the rearwardly projecting handlebar 27 and the attachment point of the skid to the handlebar. Its length is not critical and varies according to the different parameters.

A third wheel 95 has been found to be useful to provide a third rolling ground contact point for balancing the device and to prevent the device from tipping forward. In the preferred embodiment, this third wheel 95 is attached to an adjustable, downwardly projecting member 97 attached to the frame brace 33 located forward of the axle. The upward or downward adjustment of this wheel may be accomplished by a screw mechanism 99 or by any other suitable means. The adjustable feature of this wheel is utilized when one-man remote control operation of the device is performed.

For one man remote control operation of the device, a remote control switch 101 on an extension cord 103 is utilized as an alternative to the starter switch 29 on the handlebar 27. It allows a single operator to sit within the disabled vehicle and steer it, while at the same time activating the device by means of the remote control switch 101. The extension cord 103 must therefore be of sufficient length to reach from the device at the back of the vehicle to the driver's seat, and small magnets 105 may be attached along the cord to fasten it to the vehicle to keep it off the ground. In attempting to utilize the device by remote control, the operator must first position the device at the back of the vehicle and depress the handlebar 27 downwardly so as to engage the bumper within the "L" shaped push frame yoke 41. To maintain this engagement, the operator then adjusts the third wheel 95 downwardly until the third wheel contacts the ground; the push bars 37 and 39 of the device will then be held in proper elevated position relative to the bumper. The operator then proceeds to the side of the vehicle proximate the steering wheel or sits within the vehicle behind the steering wheel. Upon depressing the remote control switch 101, the device will activate and commence to push the vehicle. As the device moves forward in contact with the vehicle, its own power and the configuration of the vehicle contact point being higher off the ground than the axis of the axle will cause the device to, of itself, lift a portion of the vehicle's weight as it moves forward. The device thereby, of itself, automatically increases its tractive power and ability to push the vehicle; meanwhile, the operator is enabled to steer the disabled vehicle to a selected location.

When pushing a disabled vehicle up a hill, a sudden power failure may cause the car and device to commence to roll backwards. To prevent this from occurring a pawl 107 is secured to the electric motor housing 15 and formed to ride against the teeth of the ring gear 43. Should the device commence to roll backwards, the pawl will enter the ring gear teeth and prevent the ring gear from further reverse rotation, thus halting the reverse motion of the device. When backwards rotation is a possibility, the two wheel drive configuration should be utilized. This will prevent the uneven backwards motion of the device which could occur if one wheel was free wheeling as in the single wheel drive configuration.

The device may be formed with a simple rack 109 located on the handlebar 27 for convenient carrying of battery jumper cables 111. The device can then be used as a simple means to transport a good battery to a car having a dead battery. Utilization of the jumper cables between the dead battery and the battery of the device will permit the starting of the vehicle having the dead battery.

FIG. 5 depicts a trailer ball attachment 113 which will allow the device to push house trailers, boat trailers and other types of ball attached vehicles. It consists of two tubular members 115 which are formed to be attached to the device by downward positioning over the upwardly projecting vehicle push bars 37. The trailer ball 117 is attached to a horizontal member 119 secured between the two vertical tubular members 115.

As a further application of the present invention, a snow shovel attachment 121, as depicted in FIG. 6, may be employed to utilize the device to remove snow from walkways, driveways, and other areas. The snow shovel attachment is similar to the trailer ball attachment 113 in that it is engaged to the device utilizing two tubular members 123 which are downwardly inserted over the upwardly projecting vehicle push bars 37. The actual shovel 125 is secured to a horizontal member 127 and the two tubular members 123 by appropriate bracing 129.

From the foregoing description of the present invention it can be seen that it is essentially a lightweight device that is capable of pushing a much heavier vehicle. The power of the electric motor is not fully determinative of its pushing ability. A powerful motor could simply cause the drive wheels to tractionlessly spin as it attempted to push a heavy vehicle. In the instant device the tendency of the drive wheels to spin is greatly inhibited by the backward rotation of the frame which loads the drive wheels with a portion of the vehicle's weight to increase frictional traction. The frame configuration is therefore a significant factor in the device's ability to easily push a vehicle that may weigh more than thirty times its own weight.

It will be seen from the foregoing description of the preferred embodiment of the invention that it will perform all of the objects attributable thereto. While it has been described in considerable detail, it is not to be limited to such detail except as may be necessitated by the appended claims.

I claim:

1. A battery powered cart for pushing a disabled automobile or other large unpowered vehicle comprising a frame having a battery and electric drive motor mounted thereon, an electrical switch means for utilizing current from said battery to activate said electric drive motor, a transversely disposed axle secured to said frame, a drive wheel mounted on each of the outer ends of said axle with each drive wheel having a means for engaging said axle, means engaging the drive shaft of said electric drive motor to said axle whereby rotation of said drive shaft will cause said axle to rotate, a portion of said frame projecting forward of said axle and being formed for contacting and pushing a vehicle, said forwardly projecting portion including at least two upwardly projecting vehicle push bars which are tubular in shape and which are adapted to slidably receive mating tubular members of an accessory attachment whereby said accessory attachment can be attached to the cart by downward insertion of its tubular members over said upwardly projecting push bars, said frame and axle being aranged such that upon operation of the cart said portion of said frame contacting the vehicle will make contact at a point that is higher off the ground than the axis of said axle whereby pushing against said vehicle will cause said frame to rotate backwards about said axle whereby a portion of the weight of said vehicle will be imposed on said cart to enhance the frictional contact of the drive wheels with the ground to provide greater traction for pushing said vehicle, said frame being formed such that the length of the frame from said axle to the vehicle contact point is sufficient to place said contact point above yet relatively close in height to said axle so as to prevent the cart from rotating over backwards about said axle when pushing a vehicle, and a third wheel rotatably fixed to said frame at a point forward of said drive wheels to provide an optional third rolling ground contact point to stabilize the rotation of said frame about said axle.

2. A battery powered cart for pushing a disabled automobile or other large unpowered vehicle comprising a frame having a battery and electric drive motor mounted thereon, an electrical switch means for utilizing current from said battery to activate said electric drive motor, a transversely disposed axle residing in an axle housing that is secured to said frame, a drive wheel mounted on each of the outer ends of said axle and being selectively engagable thereto by means of a driving dog that is slidably engaged with an outer extension of said axle and secured thereto against rotation with respect to said axle by use of a dog pin which is fixably engaged to said driving dog and slidably engaged in an axial slot projecting through said axle, and a protuberance being formed by lug nuts that project from the hub of said drive wheel whereby said driving dog may be slidably moved towards said drive wheel to engage a protruding lug nut and retained in that position to thereby transmit the rotational force of said axle to said drive wheel, said driving dog having a locking means for holding it in the engaged configuration, said frame having two forwardly projecting members, each being secured at the rearward end thereof to said axle housing and each having an upwardly projecting vehicle push bar and a forwardly projecting vehicle push bar emanating from points proximate the forward end thereof whereby an "L" shaped push frame yoke is created between said upwardly and forwardly projecting vehicle push bars, said frame and axle being formed such that upon operation of the cart said vehicle push bars will contact the vehicle at a point that is higher off the ground than the axis of said axle whereby pushing said vehicle will cause said frame to rotate backwards about said axle whereby a portion of the weight of said vehicle will be supported by said cart and enhance the frictional contact of the drive wheels with the ground to provide greater traction for pushing said vehicle, the length of the frame from said axle to the apex of said "L" shaped push frame yoke angle being sufficient to prevent the cart from rotating over backwards when pushing a vehicle, said electric motor being operably engagable to said axle by utilization of a pinion gear secured to the drive shaft of said electric motor, a ring gear engaged to said axle, and an actuating means for inducing engagement of said pinion gear with said ring gear upon operation of said electric motor, a third wheel being adjustably engaged to said frame at a point forward of said drive wheels to provide a third rolling ground contact point and to allow the adjustment of the vertical displacement of said third wheel whereby said vehicle push bars may be vertically adjusted to align them with the contact point of the vehicle to be pushed, a skid bar being attached to the rear of said frame and formed to project rearwardly and downwardly from said frame to function as a leg to prevent the device from tipping over backwards, an upwardly and rearwardly projecting handlebar portion of said frame terminating at a height suitable for control and operation by a standing person and having said electrical switch means mounted thereon, a pawl being secured to said frame and arranged to engage the teeth of said ring gear and prevent reverse rotation thereof, a remote control electrical switch being formed on an electrical extension cord of sufficient length to allow the operator to sit behind the steering wheel of the vehicle being pushed and operate the device, and a rack being formed on said handlebar of said frame for carrying battery jumper cables for use in starting a disabled vehicle that has a weak battery.

* * * * *